United States Patent
Miyata et al.

[11] Patent Number: 6,141,505
[45] Date of Patent: *Oct. 31, 2000

[54] ELECTRONIC DEVICE

[75] Inventors: Akio Miyata, Tondabayashi; Yasuo Furuie, Ikeda, both of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/917,138

[22] Filed: Aug. 25, 1997

[30] Foreign Application Priority Data

Aug. 30, 1996 [JP] Japan ................................ 8-248541

[51] Int. Cl.$^7$ .............................. G03B 17/02; H04N 5/30
[52] U.S. Cl. ................... 396/535; 396/383; 396/542; 361/749; 348/376
[58] Field of Search ..................... 396/535, 542, 396/541, 448, 383, 374; 361/749, 789; 174/117 FF; 439/67, 11, 12, 13, 14, 15, 164, 445, 447; 348/373, 376, 383, 333

[56] References Cited

U.S. PATENT DOCUMENTS

| | | | |
|---|---|---|---|
| 3,353,463 | 11/1967 | Horton et al. | 439/142 |
| 3,602,118 | 8/1971 | Oberheim | 396/448 |
| 4,106,037 | 8/1978 | Nakamura et al. | 396/448 |
| 4,302,624 | 11/1981 | Newman | 439/142 |
| 4,493,542 | 1/1985 | Ohmura et al. | 396/535 |
| 4,596,454 | 6/1986 | Kawai et al. | |
| 4,864,348 | 9/1989 | Fujiwara et al. | |
| 5,009,610 | 4/1991 | Woskow | 439/142 |
| 5,043,822 | 8/1991 | Ichiyoshi et al. | 348/376 |
| 5,495,377 | 2/1996 | Kim | 361/749 |
| 5,732,305 | 3/1998 | Satou | 396/535 |
| 5,845,167 | 12/1998 | Funahashi et al. | 396/448 |

FOREIGN PATENT DOCUMENTS 2-7593 1/1990 Japan .

*Primary Examiner*—Alan A. Mathews
*Attorney, Agent, or Firm*—Burns, Doane, Swecker & Mathis, LLP

[57] ABSTRACT

A device comprising a main body and a sub-body that is rotatably supported on a side surface of the main body, wherein a bearing is located on either the main body or the sub-body and a shaft that engages with said bearing is located on the other unit, the shaft having an extension that extends into the main body or the sub-body that has the bearing and a connecting area that is formed throughout the lengths of the shaft and the extension; there is a notch that is connected to the connecting area around the circumference of the extension; and a flexible printed circuit board is placed such that it runs through the connecting area inside the shaft, exits the notch of the extension along its circumference and wraps around the extension.

18 Claims, 6 Drawing Sheets

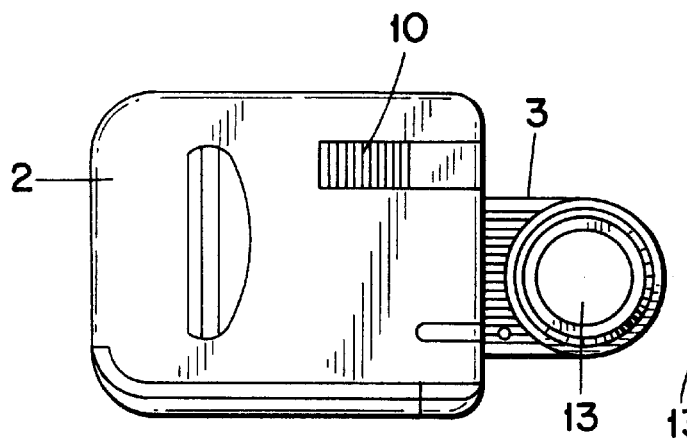
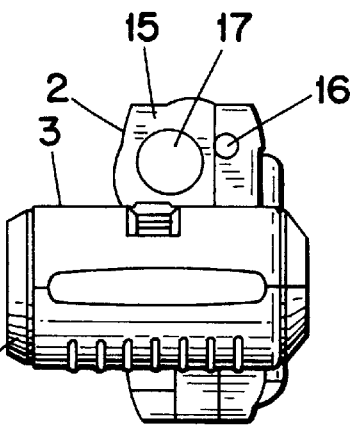
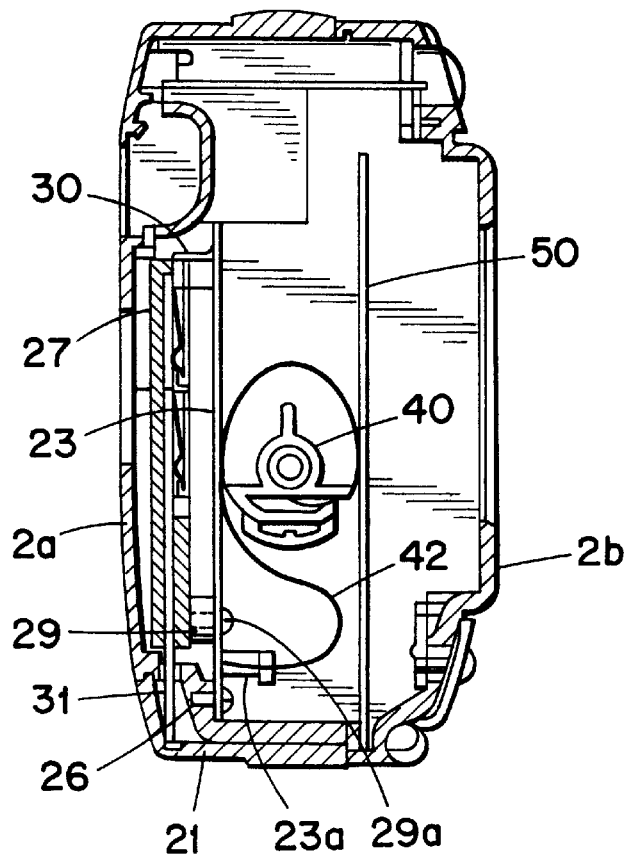

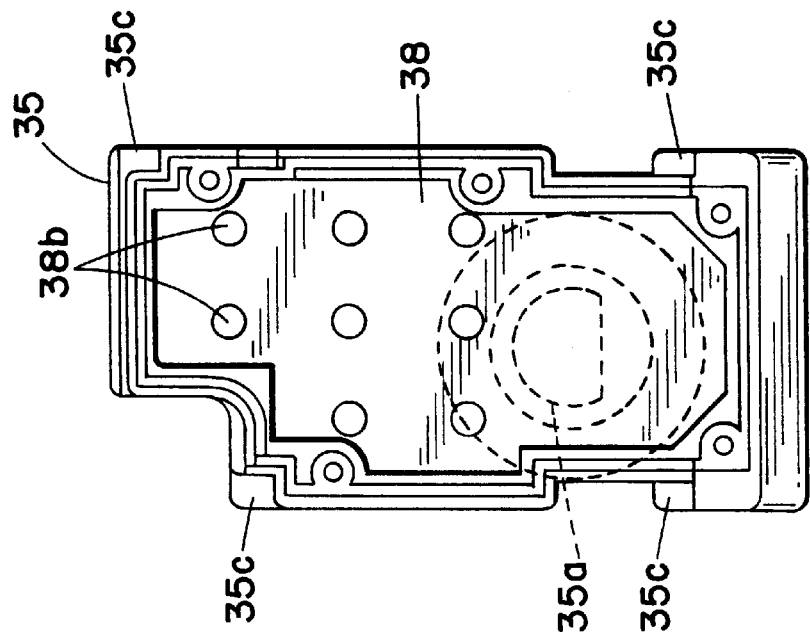
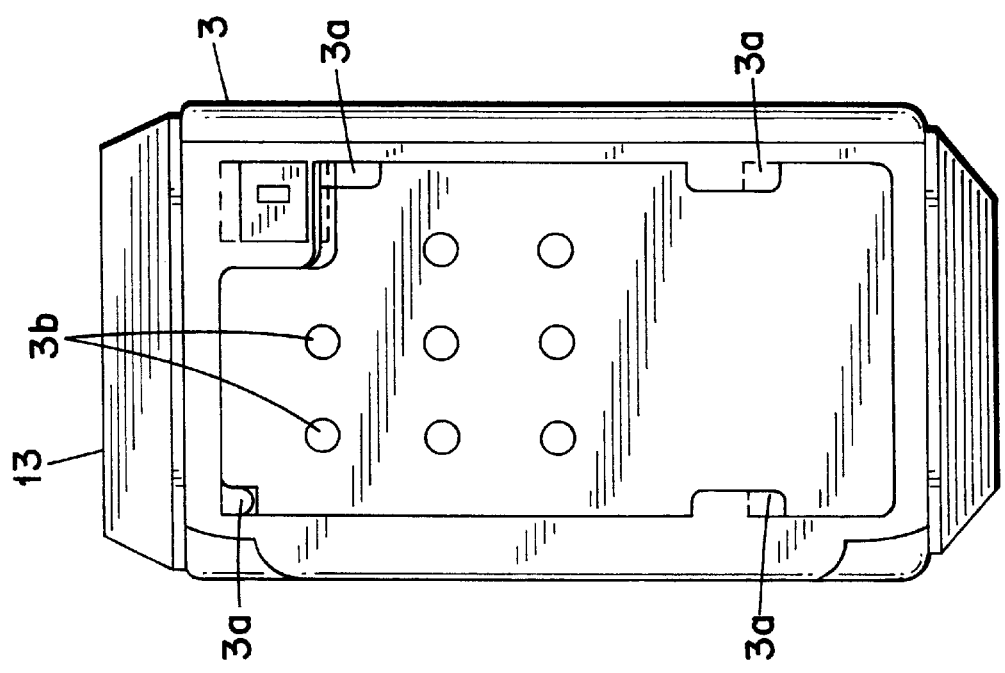

ELECTRONIC DEVICE

FIELD OF THE INVENTION

The present invention pertains to an electronic device which has a main body and a sub-body that is electrically connected to the main body and which is rotatably supported on said main body, and more particularly, to an image reading device having an image reading lens unit which is rotatably supported on a side surface of the main body.

DESCRIPTION OF THE RELATED ART

Conventionally, an image reading device having a sub-body, i.e., an image reading lens unit, that is rotatably attached to a side surface of the main body is electrically connected to the main body using flexible wiring or flexible printed circuit board. The flexible printed circuit board is placed through a connecting hole that is formed in the rotary connecting unit along the axis of the rotation, said rotary connecting unit being located between the main body and the image reading lens unit, and the ends of the flexible printed circuit board are fixed to substrates fixed inside the main body and the image reading lens unit, respectively. In addition, where terminals that are used to connect the device to external devices are placed on the main body, the connection terminals are located such that they are exposed on the surface of the main body.

However, in the device described above, where the image reading lens unit is rotated relative to the main body, the flexible printed circuit board becomes twisted near the rotary connecting unit because the flexible printed circuit board is fixed to the substrates at either end. When this happens, the flat flexible printed circuit board is pulled at the ends while it is compressed at the center, which causes fatigue over time to printed pattern of the flexible printed circuit board, as well as the substrates themselves that support the printed pattern. Further, where the connection terminals to connect to external devices are placed on the surface of the main body, the design is limited in terms of space and location for the connection terminals because of the need to make the device compact as well as due to reasons of appearance.

OBJECTS AND SUMMARY

The present invention was made in order to resolve the problems described above. Its object is to provide an electronic device in which the flexible printed circuit board does not become twisted when the sub-body is rotated relative to the main body, and in which efficient use of space is made possible by having the terminals for the connection with external devices become exposed when the sub-body is rotated, such that said arrangement may contribute to making the device compact.

In order to attain the object described above, the present invention is a device comprising a main body and a sub-body that is rotatably supported on a side surface of the main body, said main body and sub-body being electrically connected using flexible printed circuit board, wherein a bearing is located on either the main body or the sub-body and a shaft that engages with said bearing is located on the other unit, said shaft having an extension that extends into the main body or the sub-body that has the bearing and a connecting area that is formed throughout the lengths of the shaft and the extension; there is a notch that is connected to the connecting area around the circumference of the extension; and said flexible printed circuit board is placed such that it runs through the connecting area inside the shaft, exits the notch of the extension along its circumference and wraps around the extension. Therefore, when the sub-body is rotated relative to the main body, the flexible printed circuit board inside the shaft and extension rotates with the shaft and extension as one unit without becoming deformed, and the flexible printed circuit board wrapping around the extension becomes deformed such that it becomes tighter or looser around the extension, so that the flexible printed circuit board does not become twisted.

The present invention is also a device comprising a main body and a sub-body that is rotatably supported on a side surface of the main body, wherein external connection terminals are located on a side surface of the main body that faces the sub-body and said external connection terminals become exposed or non-exposed depending on the status of rotation of the sub-body.

Using the construction described above, efficient use of space is made possible by using as the location for the external connection terminals the side surface of the main body that faces the sub-body and that becomes exposed when the sub-body is rotated, such that the design may accommodate the device that is made compact.

These and other objects, advantages and features of the invention will become apparent from the following description thereof taken in conjunction with the accompanying drawings which illustrate specific embodiment of the invention.

BRIEF DESCRIPTION OF THE DRAWINGS

In the following description, like parts are designated by like reference numbers throughout the several drawings.

FIG. 2(a) is a front elevation of the digital camera during image reading.

FIG. 2(b) is a side elevation of what is shown in FIG. 2(a).

FIG. 4 is a cross-sectional view of what is shown in FIG. 3 cut along the A—A line.

FIG. 7(a) is a plan view of the surface of the image reading lens unit that is detachably connected to the main body.

FIG. 7(b) is a perspective diagram of the surface of the rotary member on the side of the main body to which the image reading lens unit is detachably connected.

DESCRIPTION OF THE PREFERRED EMBODIMENT

Figure 1A:
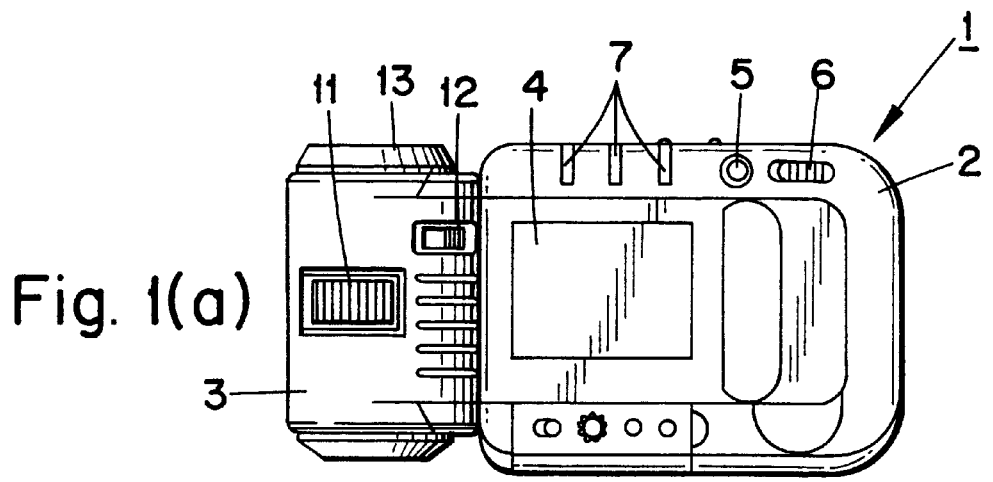
FIG. 1(a) is a rear elevation of a digital camera in which the present invention is used.
Figure 1B:
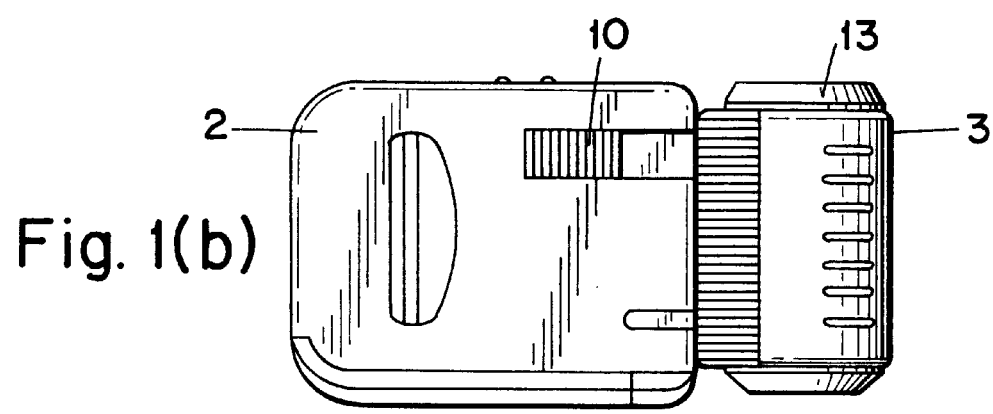
FIG. 1(b) is a front elevation of said digital camera.
Figure 1C:
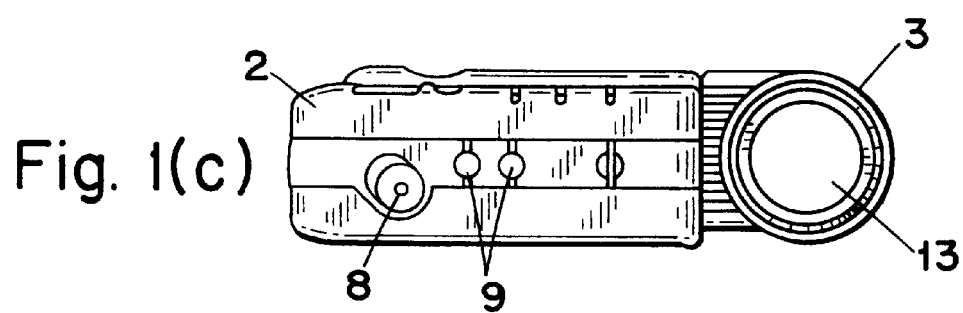
FIG. 1(c) is a plan view of said digital camera.
Figure 1D:
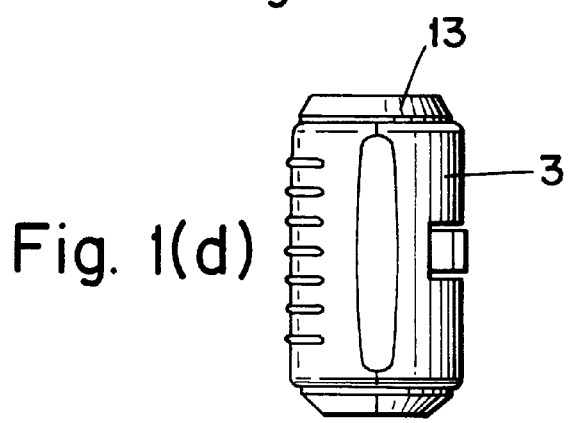
FIG. 1(d) is a side elevation of said digital camera.

FIGS. 1(a), (b), (c) and (d) are a rear elevation, front elevation, plan view and side elevation, respectively, of a digital camera pertaining to one embodiment of the image reading device (electronic device) of the present invention.

Digital camera 1 comprises main body 2 and sub-body (image reading lens unit 3), wherein sub-body is rotatably and detachably connected to one side surface of main body 2. Liquid crystal monitor 4 that is used to observe the images read, main switch 5, image reading/replay switching button 6 and various mode switching buttons 7 are located on the rear surface of main body 2. Shutter release button 8 and frame forwarding/returning buttons 9 are located on the top surface of main body 2, and flash 10 is located on the front surface. Zoom lever 11 and image reading lens unit removal lever 12 are located on image reading lens unit 3. When the device is stored, image reading lens unit 3 is made parallel to main body 2 such that image reading lens 13 faces upward, and when the device is used for image reading, image reading lens unit 3 is rotated (tilted) by 90 degrees relative to main body 2. In addition, although not shown in the drawings, located inside image reading lens unit 3 are a lens unit including a CCD element and image reading lens 13 that forms an image on the CCD element, a drive mechanism that drives the lens unit to change the image forming magnification in response to the operation of zoom lever 11 and a substrate that supports the CCD element, and electric components of the drive mechanism.

FIGS. 2(a) and (b) are a front elevation and side elevation, respectively, of the device during image reading. External connection terminals such as DC power input terminal 16 and digital input/output terminal 17 are located on side surface 15 of main body 2 that faces image reading lens unit 3. These external connection terminals become exposed during image reading for which image reading lens unit 3 is rotated by 90 degrees, while they become unexposed when the device is stored.

Figure 3:
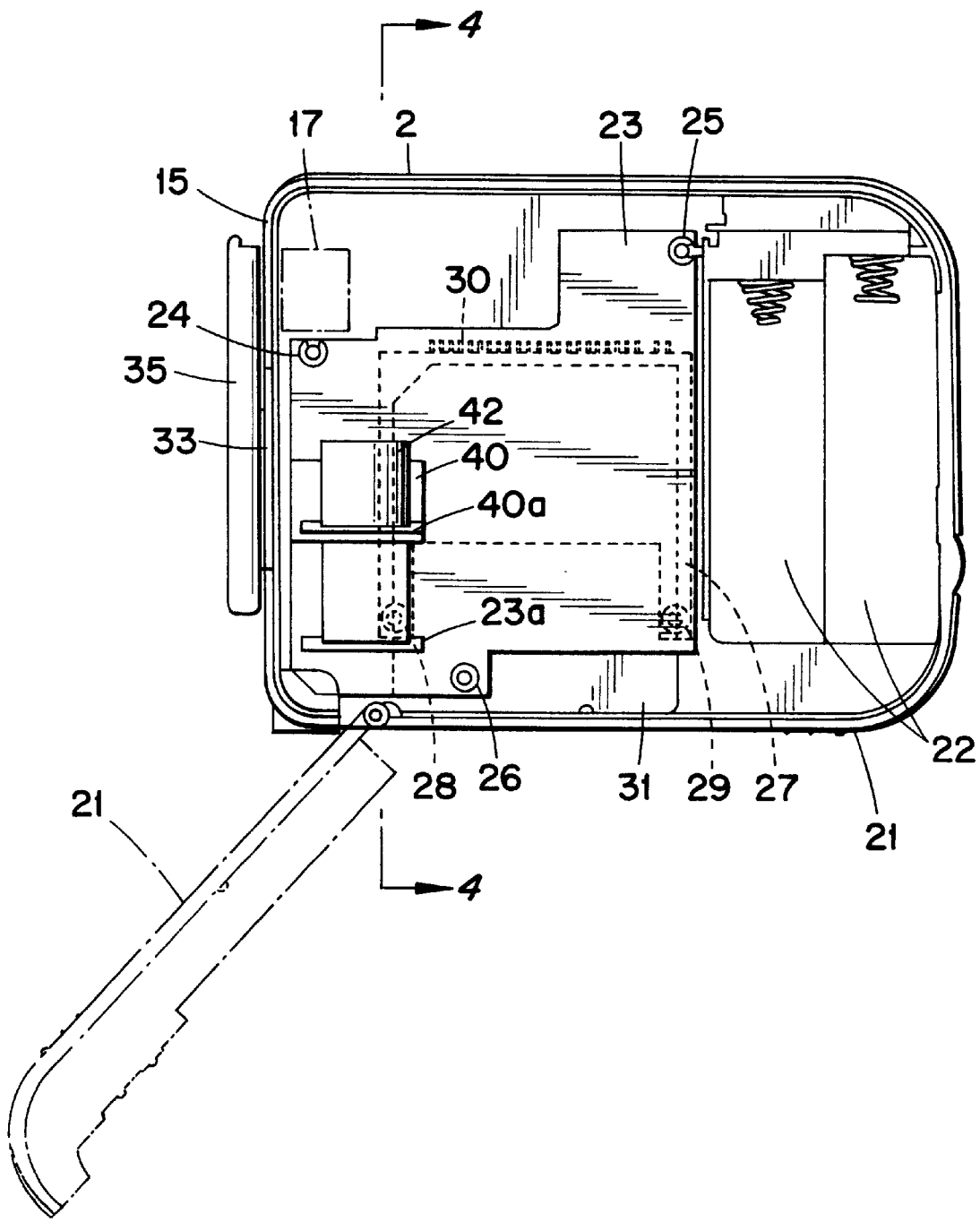
FIG. 3 is a rear elevation of the main body in which the image reading lens unit and the rear cover are removed.
Figure 5A:
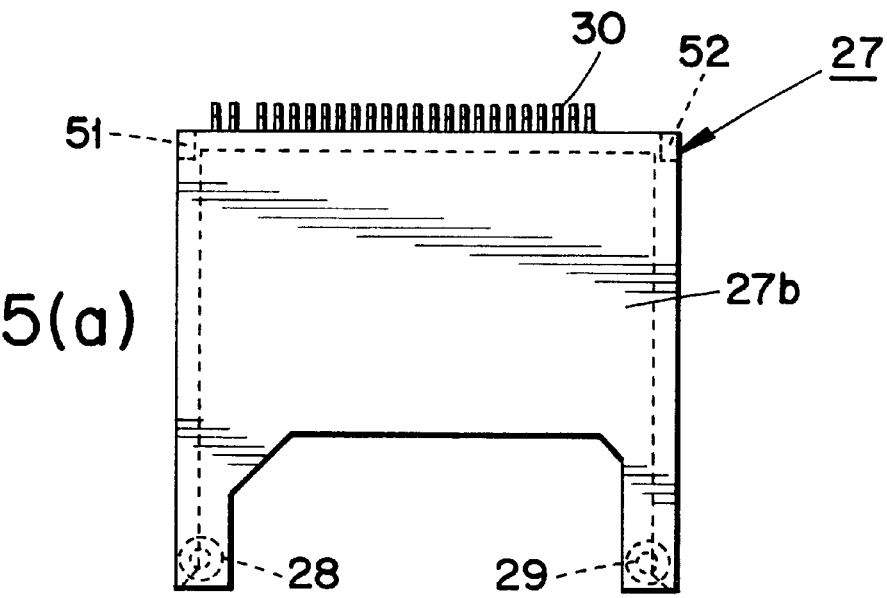
FIG. 5(a) is a front elevation of a card connector placed inside the main body.

FIG. 3 is a rear elevation of main body 2 in which image reading lens unit 3 and the rear cover are removed. FIG. 4 is a cross-sectional view of what is shown in FIG. 3 cut along the A—A line. FIG. 5(a),(b),(c) are a drawings that show a card connector that is located inside main body 2. Battery compartment cover 21 that opens and closes via rotation is located on the bottom surface of main body 2, and battery compartment 22 is formed inside the main body. Main body 2 comprises front cover 2a and rear cover 2b, and hard printed substrate 23 on which chip components, etc., are mounted is fixed to front cover 2a by means of bosses 24, 25 and 26. Further, card connector (or card holder) 27 is attached to this printed substrate 23. On the other hand, hard printed substrate 50 is fixed to rear cover 2b, and liquid crystal monitor 4 and the chip components, etc., described above are mounted on this printed substrate 50.

Figure 5B:
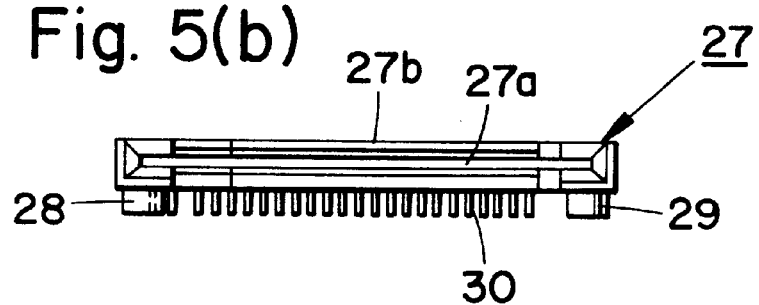
FIG. 5(b) is a bottom view of said card connector.
Figure 5C:
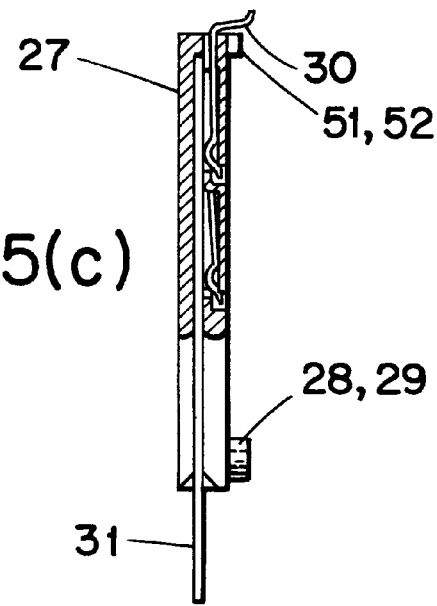
FIG. 5(c) is a cross-sectional view of said card connector.

Card connector 27 comprises card insertion part 27a in which compact memory card (SSFDC: hereinafter termed 'card') 31 on which is recorded data regarding read images is inserted, and main receiving part 27b having connecting pins 30 that are electrically connected to card 31 that is inserted in card insertion part 27a. Card connector 27 has attaching members (also called 'stand-off protrusions') 28, 29, 51 and 52 to attach main receiving part 27b to printed substrate 23 while maintaining them at a certain distance from each other. Among those, attaching members 28 and 29 on the side of card insertion part 27a are located, as can be seen from FIGS. 3 and 5(a), such that they will be placed within the plane of projection of main receiving part 27b, or in other words, such that they will be located directly under card 31 as shown in FIG. 5(b). Card connector 27 on the side of card insertion part 27a is fixed by screwing screws 29a into the screw holes in attaching members 28 and 29, from the direction of front surface of printed substrate 23. Card connector 27 on the side of connecting pins 30 is fixed such that a certain distance is maintained between main receiving part 27b and printed substrate 23 due to attaching members 51 and 52, and connecting pins 30 are soldered to the wiring pattern of printed substrate 23. Because a space that equals the height of attaching members 28, 29, 51 and 52 is created between printed substrate 23 and main receiving part 27b of card connector 27, electronic components may also be mounted on the side of printed substrate 23 that faces card connector 27. Card insertion part 27a is covered by battery compartment cover 21. By opening battery compartment cover 21, card 31 may be inserted into or removed from card connector 27 in the same way that the batteries are inserted or removed. When battery compartment cover 21 is opened, connecting pieces on battery compartment cover 21 become separated from batteries 22 and the battery connection becomes broken. Therefore, the recorded data may be prevented from being damaged by the noise that occurs when card 31 is inserted or removed.

Bearing plate 33 to rotatably support image reading lens unit 3 and rotary member 35 that is supported by the bearing of this bearing plate 33 and that rotates together with image reading lens unit 3 are located on side surface 15 of main body 2, as shown in FIG. 3. This rotary member 35 is used to make image reading lens unit 3 detachably connected to main body 2 and to create an electrical connection between main body 2 and image reading lens unit 3. Flexible printed circuit board 42 (see FIG. 4) is placed inside main body 2 for the electrical connection between the two units, as if it were wrapped around extension 40 described below (details are described below). One end 42b of flexible printed circuit board 42 is connected to connector 23a on printed substrate 23.

Figure 6:
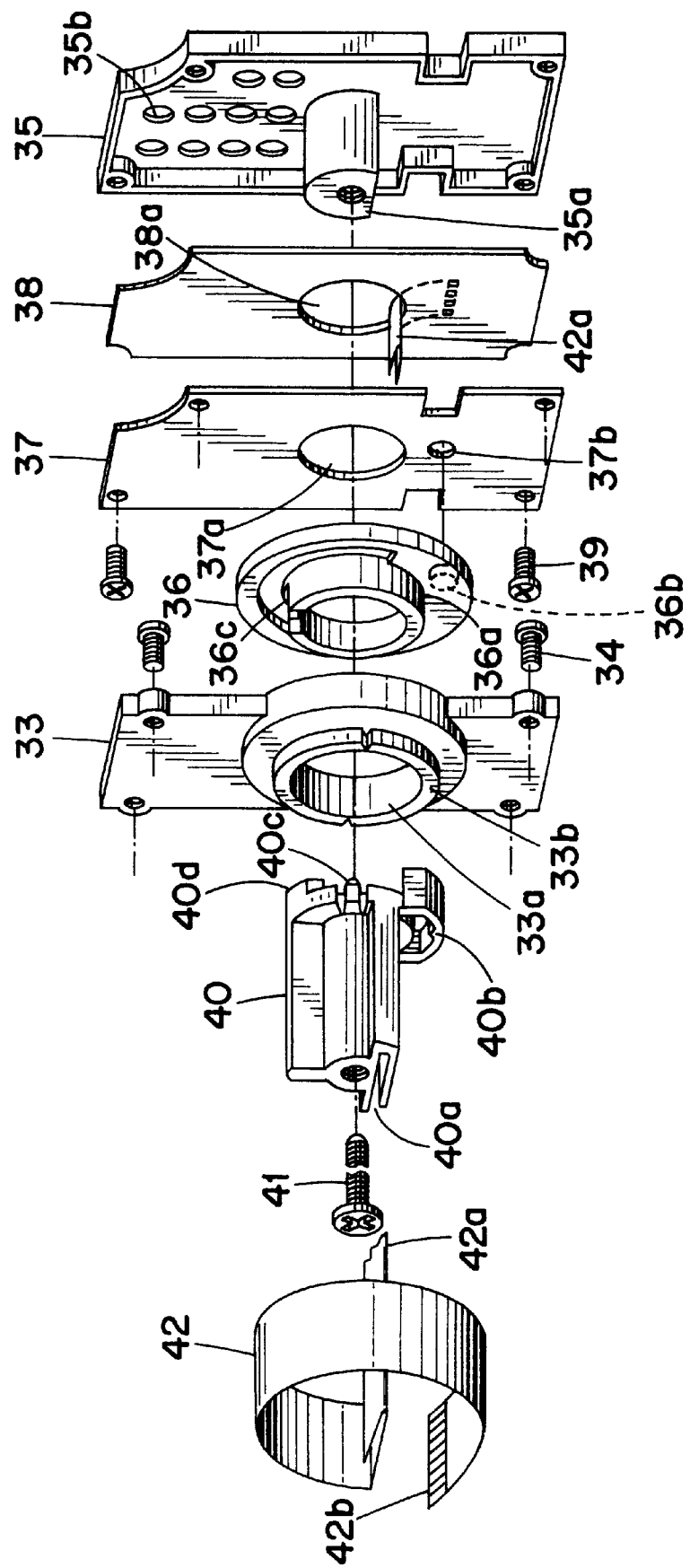
FIG. 6 is a perspective view showing in a disassembled fashion the construction that rotatably supports the image reading lens unit.

FIG. 6 is a perspective view showing in a disassembled fashion the details of the construction that rotatably supports the image reading lens unit. Bearing plate 33 is fixed to main body 2 using screws 34, and shaft 36a of shaft member 36 is movably supported by bearing 33a of bearing plate 33. Rotary member 35 has boss 35a that engages inside shaft member 36 and a section of which is cut off along its axis. By integrally assembling rotary member 35 with shaft member 36, a shaft having a connecting area is formed. Reinforcement plate 37 and detachable substrate 38 having connecting pieces are fixed by means of screws 39 to this rotary member 35. Moreover, extension 40 that is in contact with a side surface of shaft member 36, extends toward the interior of main body 2 and has the function of a clicking member is also connected to rotary member 35. Extension 40 is fixed to boss 35a of rotary member 35 by means of screw 41. As a result, shaft member 36 on the rotation side and extension 40 come to sandwich bearing plate 33 on the fixed side. Shaft member 36 is allowed to rotate only within the range of a prescribed angle relative to bearing plate 33. Further, a clicking feel is made to accompany the rotation by means of concave part 33b and convex part 40b, and a thrust is provided by means of protrusion 40c. Shaft member 36 and reinforcement plate 37 are prevented from rotating relative to each other due to the engagement of protrusion 36b and hole 37b, while shaft member 36 and extension 40 are prevented from rotating relative to each other due to the engagement of notch 36c and protrusion 40d.

Inside shaft 36a, a connecting area is formed by means of boss 35a and extension 40, said boss having one section cut off. Notch 40a that is connected to the connecting area is formed along the circumference of extension 40. Flexible printed circuit board 42 that electrically connects main body 2 and image reading lens unit 3 runs through hole 37a of reinforcement plate 37 and hole 38a of detachable substrate 38. It then runs through the connecting area inside shaft 36a and exits notch 40a of extension 40 toward its circumference and wraps around extension 40. The tip of one end 42a of flexible printed circuit board 42 is attached to the terminal of detachable substrate 38 and the other end 42b is connected to connector 23a on printed substrate 23, as described above. Connecting pieces 38b of detachable substrate 38 (see FIG. 7 explained below) face holes 35b formed on rotary member 35, such that electrical connection will occur when image reading lens unit 3 is mounted on rotary member 35.

FIGS. 7(a) and (b) are a plan view of the surface of image reading lens unit 3 which is detachably connected to main body 2 and a perspective diagram of the surface of rotary member 35 on the side of main body 2 on which image reading lens unit 3 is detachably connected, respectively. Connecting pins 3b are located on image reading lens unit 3 at locations that face said connecting pieces 38b of detachable substrate 38 facing the holes 35b of rotary member 35. When image reading lens unit 3 is mounted on rotary member 35, connecting pins 3b come into contact with connecting pieces 38b and electrical connection occurs. Stopper 3a to engage with rotary member 35 is located on image reading lens unit 3 and stopper 35c that engages with said stopper 3a is located on rotary member 35.

Digital camera 1 that is constructed in the manner described above is stored by making image reading lens unit 3 parallel to main body 2, as shown in FIG. 1, and is used for the purpose of regular image reading by rotating image reading lens unit 3 by 90 degrees, as shown in FIG. 2. Image reading is possible when the camera is in the storage condition. Image reading is also possible if the 90-degree rotation of image reading lens unit 3 is stopped halfway. Further, the camera may also be used by rotating image reading lens unit 3 by 90 degrees in the opposite direction (for image reading using the self-timer function, etc.). When this is done, the display on liquid crystal monitor 4 switches appropriately so that the image will be shown erect. In the condition shown in FIG. 2, external connection terminals such as DC power input terminal 16 and digital input/output terminal 17 become exposed on side surface 15 of main body 2, so that a DC power source and an external device such as a computer to perform image editing may be connected and used. Because side surface 15 of main body 2 is used for the placement of the external connection terminals, the design problem of securing space for the placement of these terminals on the external surface of main body 2 that has become compact may be eliminated.

In addition, when image reading lens unit 3 is rotated relative to main body 2, flexible printed circuit board 42 that electrically connects the two units simply wraps around extension 40 and does not become twisted. Therefore, fatigue to the wiring over time may be reduced.

Further, since card connector 27 has attaching members 28 and 29 to attach main receiving part 27b that receives card 31 to printed substrate 23 at a certain distance, and the attaching members are located within the plane of projection of main receiving part 27b, even though only a limited space is available due to the reduced size of the device, card connector 27 does not interfere with the surrounding members that are also mounted. Moreover, because main receiving part 27b is attached to printed substrate 23 and maintained at a certain distance from it, the mountable area of printed substrate 23 may be effectively used.

The present invention is not limited to the construction of the embodiment described above, but may be implemented in other variations. For example, bearing plate 33 is placed on side surface 15 of main body 2 and rotary member 35 is supported by the bearing of this bearing plate 33 in order to make image reading lens unit 3 rotatable and detachable relative to main body 2 in the embodiment described above, but the bearing plate and the bearing may have the opposite relationship. In the embodiment described above, the shaft and the extension are formed using multiple members that are connected with one another in order to restrict the movement of the shaft along its axis, but a member to restrict the movement along the axis may be separately installed and the shaft and the extension may be formed as a single member. Further, the part of the flexible printed circuit board that extends from the extension perpendicular to its axis need not wrap around the entire circumference of the extension: it is acceptable so long as that part of the flexible printed circuit board is of a length that allows for some looseness that can absorb the amount that the notch of the extension travels due to the rotation of the image reading lens unit.

Although the preferred embodiment of the invention have been described in the foregoing detailed description and illustrated in the accompanying drawings, it will be understood that the invention is not limited to the embodiment disclosed, but is capable of numerous rearrangements, modifications and substitutions of parts and elements without departing from the spirit of the invention. Accordingly, the present invention is intended to encompass such rearrangements, modifications and substitutions of parts and elements as fall within the spirit and scope of the invention.

What is claimed is:

1. A electronic device comprising:
    a first body;
    a second body rotatably supported on a side surface of the first body;
    a bearing located on the side surface of the first body;
    a shaft located on the second body and engaged with said bearing, wherein the shaft has an extension extended into the first body; and
    a flexible printed circuit board held in said shaft and said extension, exited from said extension in circumference direction of said extension, and wrapped around said extension.

2. A device according to claim 1, further comprising:
    a substrate fixed inside the first body, wherein one end of said flexible printed circuit board exited from the extension fixed to the substrate.

3. A device according to claim 2, wherein said second body including a image reading device, and the other end of said flexible printed circuit board connected to the image reading device.

4. A device according to claim 1, further comprising:
    a external terminal located on a side surface of the first body that faces the second body, wherein the external terminal become exposed or non-exposed depending on the status of rotation of the second body.

5. A device according to claim 1, further comprising:
    a rotary member fixed to said shaft and detachably support said second body.

6. A structure for installing a flexible printed circuit board, comprising:
    a flexible printed circuit board having a first portion having a most distal end of said flexible printed circuit board, a second portion having a most proximal end of said flexible printed circuit board, and a middle portion located between said most distal end and said most proximal end, said middle portion being fixed to a rotatable shaft, said first portion of said flexible printed circuit board having said most distal end wrapping around a circumference of said shaft, and said second portion of said flexible printed circuit board having said most proximal end extending away from said first portion and along a longitudinal axis of said rotatable shaft.

7. An electronic device comprising:

a main body having a first electronic unit;

a sub-body having a second electronic unit connected to said first electronic unit, said sub-body being rotatably supported on a surface of the main body by a shaft, said shaft located substantially perpendicular to the surface of the main body; and an external terminal for connection with an external device located on the surface of the main body, wherein the external terminal becomes exposed for connection with the external device or nonexposed depending on the status of rotation of the sub-body.

8. The electronic device according to claim 7, wherein said sub-body includes a lens and is rotatable about an axis perpendicular to an optical axis of said lens.

9. The electronic device according to claim 8, wherein said shaft is substantially perpendicular to said optical axis.

10. The electronic device according to claim 7, wherein said main body includes a camera body.

11. The electronic device according to claim 7, wherein said second electronic unit is an image reading unit.

12. A camera, comprising:

a camera body;

an image reading unit;

a rotatable shaft connecting said camera body to said image reading unit such that said camera body and said image reading unit are movable with respect to each other; and a flexible printed circuit board electrically connecting said camera body and said image reading unit, said flexible printed circuit board being fixed to said rotatable shaft and extending at least partially about a circumference of said rotatable shaft.

13. The camera according to claim 12, wherein said rotatable shaft extends into an interior of said camera body.

14. A flexible printed circuit board connection, comprising:

an electrical connector;

a rotatable shaft spaced from said electrical connector; and a flexible printed circuit board having a first portion fixed to said rotatable shaft and a second portion unattached to said shaft, said second portion of said flexible printed circuit board wrapping at least half way around a circumference of said shaft and attaching to said electrical connector.

15. The flexible printed circuit board connection according to claim 14, further comprising a camera body and an image reading unit, a first end of said flexible printed circuit board being connected to said image reading unit and said second end of said flexible printed circuit board being connected to said camera body, said rotatable shaft connecting said camera body and said image reading unit.

16. The flexible printed circuit board connection according to claim 14, wherein said rotatable shaft has an outer surface and a notch in said outer surface that receives said first portion of said flexible printed circuit board.

17. An electronic device, comprising:

a camera body;

an image reading unit rotatably supported on a side surface of said camera body;

one of an input terminal and an output terminal located on said side surface, said image reading unit obstructing said terminal when rotated to a first position, said terminal being unobstructed by said image reading unit when said image reading unit is rotated to a second position.

18. An electronic device comprising:

a main body having a first electronic unit;

a sub-body having a second electronic unit connected to said first electronic unit, said sub-body being rotatably supported on a surface of the main body; and one of an input terminal and an output terminal being located on said surface, said sub-body obstructing said terminal when rotated to s first position, said terminal being unobstructed by said sub-body when said sub-body is rotated to a second position.

* * * * *